(12) United States Patent
Hammam et al.

(10) Patent No.: US 9,667,538 B2
(45) Date of Patent: May 30, 2017

(54) METHOD AND APPARATUS FOR CONNECTING A GATEWAY ROUTER TO A SET OF SCALABLE VIRTUAL IP NETWORK APPLIANCES IN OVERLAY NETWORKS

(71) Applicant: Telefonaktiebolaget L M Ericsson (publ), Stockholm (SE)

(72) Inventors: Tarik Hammam, Kista (SE); Anders Franzen, Trangsund (SE); Shukri Abdallah, Vienna, VA (US); Fredrick Beste, Uppsala (SE)

(73) Assignee: TELEFONAKTIEBOLGET L M ERICSSON (PUBL), Stockholm (SE)

( * ) Notice: Subject to any disclaimer, the term of this patent is extended or adjusted under 35 U.S.C. 154(b) by 100 days.

(21) Appl. No.: 14/613,348

(22) Filed: Feb. 3, 2015

(65) Prior Publication Data

US 2016/0226755 A1 Aug. 4, 2016

Related U.S. Application Data

(60) Provisional application No. 62/110,451, filed on Jan. 30, 2015.

(51) Int. Cl.
*H04L 12/46* (2006.01)
*H04L 12/715* (2013.01)
(Continued)

(52) U.S. Cl.
CPC .......... *H04L 45/64* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 6,732,314 B1* 5/2004 Borella ............... H03M 13/03
714/752
7,526,658 B1* 4/2009 He ....................... H04L 63/065
713/190

(Continued)

FOREIGN PATENT DOCUMENTS

WO 2013135753 A1 9/2013

OTHER PUBLICATIONS

International Search Report and Written Opinion, International Application No. PCT/EP2016/050429, mailed Mar. 18, 2016, 12 pages.

(Continued)

*Primary Examiner* — Bunjob Jaroenchonwanit
(74) *Attorney, Agent, or Firm* — Nicholson De Vos Webster & Elliott, LLP

(57) ABSTRACT

A method in a gateway router is described. The method includes receiving traffic with a destination of a virtual internet protocol (VIP) address corresponding to a scalable VIP appliance; selecting a point-to-point VIP tunnel associated with the VIP address, wherein the point-to-point VIP tunnel encapsulates a point-to-point link between the gateway router and the scalable VIP appliance; separating one or more packets within the traffic; classifying each of the one or more separated packets based on one or more indicators of the one or more separated packets; and forwarding each of the one or more separated packets to one of one or more IP tunnels based on the classification of each of the separated packets, wherein the one or more IP tunnels are connected to the scalable VIP appliance and wherein the one or more IP tunnels comprise a forwarding tunnel group associated with the point-to-point VIP tunnel.

26 Claims, 9 Drawing Sheets

(51) Int. Cl.
*H04L 12/803* (2013.01)
*H04L 12/851* (2013.01)
*H04L 12/713* (2013.01)
*H04L 12/773* (2013.01)
*H04L 29/08* (2006.01)

(52) U.S. Cl.
CPC ............ *H04L 45/586* (2013.01); *H04L 45/60* (2013.01); *H04L 47/125* (2013.01); *H04L 47/2441* (2013.01); *H04L 67/1002* (2013.01)

(56) References Cited

U.S. PATENT DOCUMENTS

| | | | | |
|---|---|---|---|---|
| 7,882,558 B1* | 2/2011 | Lin | H04L 12/4641 | 726/15 |
| 7,940,685 B1* | 5/2011 | Breslau | H04L 43/0835 | 370/251 |
| 8,014,380 B2* | 9/2011 | Lewis | H04L 12/4633 | 370/351 |
| 8,542,595 B2* | 9/2013 | Hussain | H04L 12/5693 | 370/230 |
| 9,007,941 B1* | 4/2015 | Miclea | H04L 29/0621 | 370/252 |
| 9,331,940 B2* | 5/2016 | Balus | H04L 45/745 | |
| 2004/0117438 A1* | 6/2004 | Considine | G06F 11/2074 | 709/203 |
| 2004/0117508 A1* | 6/2004 | Shimizu | H04L 29/06 | 709/249 |
| 2004/0165581 A1* | 8/2004 | Oogushi | H04L 12/2856 | 370/352 |
| 2004/0177157 A1* | 9/2004 | Mistry | H04L 12/4641 | 709/241 |
| 2004/0221051 A1 | 11/2004 | Liong et al. | | |
| 2005/0129019 A1* | 6/2005 | Cheriton | H04L 63/0272 | 370/392 |
| 2005/0265308 A1* | 12/2005 | Barbir | H04L 12/4641 | 370/351 |
| 2006/0236378 A1* | 10/2006 | Burshan | H04L 63/0272 | 726/4 |
| 2007/0064673 A1* | 3/2007 | Bhandaru | H04L 12/4633 | 370/351 |
| 2007/0081530 A1* | 4/2007 | Nomura | H04L 12/185 | 370/389 |
| 2008/0263388 A1* | 10/2008 | Allen | G06F 11/2023 | 714/4.1 |
| 2008/0304456 A1* | 12/2008 | Iino | H04L 12/2856 | 370/338 |
| 2009/0199290 A1* | 8/2009 | McCullough | H04L 63/0272 | 726/12 |
| 2011/0307629 A1* | 12/2011 | Haddad | H04L 29/12358 | 709/245 |
| 2013/0163601 A1* | 6/2013 | Kim | H04L 45/02 | 370/400 |
| 2013/0227291 A1* | 8/2013 | Ahmed | H04L 63/0281 | 713/171 |
| 2013/0322255 A1* | 12/2013 | Dillon | H04L 47/22 | 370/236 |
| 2014/0146817 A1 | 5/2014 | Zhang et al. | | |
| 2014/0189145 A1* | 7/2014 | Frydman | H04L 69/22 | 709/231 |
| 2014/0223541 A1* | 8/2014 | Yoon | H04L 63/0272 | 726/15 |
| 2015/0222734 A1* | 8/2015 | Inada | H04L 12/4633 | 370/315 |
| 2015/0229724 A1* | 8/2015 | Ray | H04L 12/4633 | 370/352 |
| 2015/0381569 A1* | 12/2015 | Visser | H04L 63/0272 | 726/15 |
| 2016/0028626 A1* | 1/2016 | Koganti | H04L 49/356 | 370/390 |

OTHER PUBLICATIONS

'IEEE Std for Local and metropolitan area networks—Link Aggregation,' IEEE Computer Society; *IEEE Std 802.1AX-2008*; IEEE 3 Park Avenue, New York, NY 10016-5997; Nov. 3, 2008; 162pgs.

Borella, et al., Network Working Group; *RFC 3103*; 'Realm Specific IP: Protocol Specification,' copyright The Internet Society (2001); Oct. 2001; 54pgs.

Farinacci, et al., "Generic Routing Encapsulation (GRE)," Network Working Group; *RFC 2784*, copyright 2000 The Internet Society; Mar. 2000; 9pgs.

Mahalingham, et al., Independent Submission; *RFC 7348*; 'Virtual eXtensible Local Area Network (VXLAN): A Framework for Overlaying Virtualized Layer 2 Networks over Layer 3 Networks,' copyright 2014 IETF Trust; Aug. 2014; 22pgs.

Rosen, et al., Network Working Group; *RFC 4364*; BGP/MPLS IP Virtual Private Networks (VPNs), copyright The Internet Society (2006); Feb. 2006; 47pgs.

Conta et al., Network Working Group; *RFC 2473*; 'Generic Packet Tunneling in IPv6,' Specification; copyright The Internet Society (1998); Dec. 1998; 33pgs.

Atlas, et al., "An Architecture for the Interface to the Routing System draft-ietf-i2rs-architecture-08," I2RS Arch, Jan. 2015, pp. 1-32.

Atlas, et al., "Interface to the Routing System Problem Statement draft-ietf-i2rs-problem-statement-06," I2RS Problem Statement, Jan. 7, 2015, pp. 1-11.

Clarke, et al., "Interface to the Routing System (I2RS) Traceability: Framework and Information Model draft-ietf-i2rs-traceability-00," I2RS Traceability, Dec. 11, 2014, pp. 1-12.

Voit, et al., "Requirements for Subscription to YANG Datastores draft-voit-i2rs-pub-sub-requirements-00," YANG Subscription Requirements, Dec. 10, 2014, pp. 1-13.

* cited by examiner

METHOD AND APPARATUS FOR CONNECTING A GATEWAY ROUTER TO A SET OF SCALABLE VIRTUAL IP NETWORK APPLIANCES IN OVERLAY NETWORKS

CROSS-REFERENCE TO RELATED APPLICATIONS

This application claims the benefit of U.S. Provisional Application No. 62/110,451, filed Jan. 30, 2015, which is hereby incorporated by reference.

FIELD

Embodiments of the invention relate to computer networks; and more specifically, to a method and apparatus for connecting a gateway router to a set of scalable virtual IP network appliances in overlay networks.

BACKGROUND

As users' demand of a web application or other service on a server (e.g., file server, database server, customer relationship management server) increases, typically a single server end station is no longer sufficient to serve the number of requests to the server. Instead, the service is distributed across a collection of server end stations, each running an instance of the server software and possibly sharing certain resources, such as a storage backend. When a request arrives at this collection of servers, or server farm, the request is routed to a particular server on the server farm for that server to process this request. The multiple requests that arrive at the server farm should be distributed among the various servers in such a way such that the resource load on each server is roughly equal to the other servers, or such that the server farm can be utilized efficiently to serve all the requests without any single request incurring any significant penalty in response time or other performance metric.

This distribution of requests is typically performed by a server load balancer, which may be implemented using a combination of hardware and/or software. A request that is routed to the server farm may encounter this server load balancer before being routed to one of the servers in the server farm by the load balancer. As the server load balancer minimally processes any traffic it receives, and in most cases simply redirects the traffic based on a distribution algorithm, it can handle more traffic than a single server in the server farm can. Thus, one server load balancer may be able to redirect requests for a large number of servers on the server farm.

However, as the number of requests and processes that the server farm needs to service increases, eventually a single server farm may not be able to handle all the requests within an acceptable performance requirement. In this case, the server farm may employ more than one server load balancer in order to redirect the very large number of requests received by the server farm.

Current implementations of server load balancers are not able to scale easily to meet the demands of a large server farm as the amount of traffic and the number of servers in the server farm grows. Many implementations of server load balancers are not scalable at all, one example being where a single server load balancer is connected to one or more servers of a server farm in a Virtual Local Area Network (VLAN), and the VLAN communicates with an external network through a router. Other implementations, such as those using link aggregation, are confined to a single broadcast domain and become unpractical in datacenters with a tiered hierarchy of switches, among other issues.

Therefore, a better solution to scaling a server load balancer is desired.

SUMMARY

According to some embodiments, a method in a gateway router for connecting a gateway router to a set of scalable virtual IP network appliances in overlay networks according to an embodiment of the invention is described. The method includes receiving traffic with a destination of a virtual internet protocol (VIP) address corresponding to a scalable VIP appliance; selecting a point-to-point VIP tunnel associated with the VIP address, wherein the point-to-point VIP tunnel encapsulates a point-to-point link between the gateway router and the scalable VIP appliance; separating one or more packets within the traffic; classifying each of the one or more separated packets based on one or more indicators of the one or more separated packets; and forwarding each of the one or more separated packets to one of one or more IP tunnels based on the classification of each of the one or more separated packets, wherein the one or more IP tunnels are connected to the scalable VIP appliance, and wherein the one or more IP tunnels comprise a forwarding tunnel group associated with the point-to-point VIP tunnel.

According to some embodiments, the gateway router is connected to a plurality of point to point VIP tunnels, with each point to point VIP tunnel corresponding to a scalable VIP appliance.

According to some embodiments, each of the one or more IP tunnels in the forwarding tunnel group is connected to a scaling unit of the scalable VIP appliance, wherein each scaling unit processes the packets that arrive at that scaling unit.

According to some embodiments, the traffic received by the gateway router is through a VPN connection.

According to some embodiments, the scalable VIP appliance is connected to a plurality of servers that are responsive to the VIP address.

According to some embodiments, traffic with a destination address that is not the VIP address is forwarded through the point-to-point VIP tunnel to the destination indicated by the destination address.

According to some embodiments, the point-to-point VIP tunnel is a layer 3 tunnel.

According to some embodiments, the one or more indicators of the one or more separated packets is based on one or more of an IP address, source port, protocol, destination port, and tunnel ID.

According to some embodiments, the method further comprises receiving a message from the scalable VIP appliance associating each of the one or more IP tunnels with one or more packet classifications.

According to some embodiments, the method further comprises receiving another message from the scalable VIP appliance indicating that a packet classification should be associated with a different one of the one or more IP tunnels.

According to some embodiments, the method further comprises sending a message to the scalable VIP appliance indicating that one of the one or more IP tunnels has failed; and receiving another message from the scalable VIP appliance indicating that a packet classification should be associated with a different one of the one or more IP tunnels.

According to some embodiments, a gateway router apparatus for connecting a gateway router to a set of scalable virtual IP network appliances in overlay networks according to an embodiment of the invention is described. The apparatus includes a network interface to receive traffic with a destination of a virtual internet protocol (VIP) address corresponding to a scalable VIP appliance; a VIP tunnel selector to select a point-to-point VIP tunnel associated with the VIP address, wherein the point-to-point VIP tunnel encapsulates a point-to-point link between the gateway router and the scalable VIP appliance; a VIP discriminator to separate one or more packets within the traffic; a distribution packet classifier to classify each of the one or more to be separated packets based on one or more indicators of the one or more to be separated packets; and a forwarding tunnel selector to forward each of the one or more separated packets to one of one or more IP tunnels based on the classification of each of the one or more separated packets, wherein the one or more IP tunnels are connected to the scalable VIP appliance, and wherein the one or more IP tunnels comprise a forwarding tunnel group associated with the point-to-point VIP tunnel.

According to some embodiments, the gateway router is connected to a plurality of point to point VIP tunnels, with each point to point VIP tunnel corresponding to a scalable VIP appliance.

According to some embodiments, each of the one or more VIP tunnels in the forwarding tunnel group is connected to a scaling unit of the scalable VIP appliance, wherein each scaling unit processes the packets that arrive at that scaling unit.

According to some embodiments, the traffic received by the gateway router is through a VPN connection.

According to some embodiments, the scalable VIP appliance is connected to a plurality of servers that are responsive to the VIP address.

According to some embodiments, the point-to-point VIP tunnel is a layer 3 tunnel. According to some embodiments, the one or more indicators of the one or more separated packets is based on one or more of an IP address, source port, protocol, destination port, and tunnel ID.

According to some embodiments, the apparatus further comprises a VIP device configurator module to create the point-to-point VIP tunnel to the scalable VIP appliance; configure the point-to-point VIP tunnel with the VIP address; and create the forwarding tunnel group associated with the point-to-point VIP tunnel Thus, embodiments of the invention allow for a method and apparatus for connecting a gateway router to a set of scalable virtual IP network appliances in overlay networks according to an embodiment of the invention.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
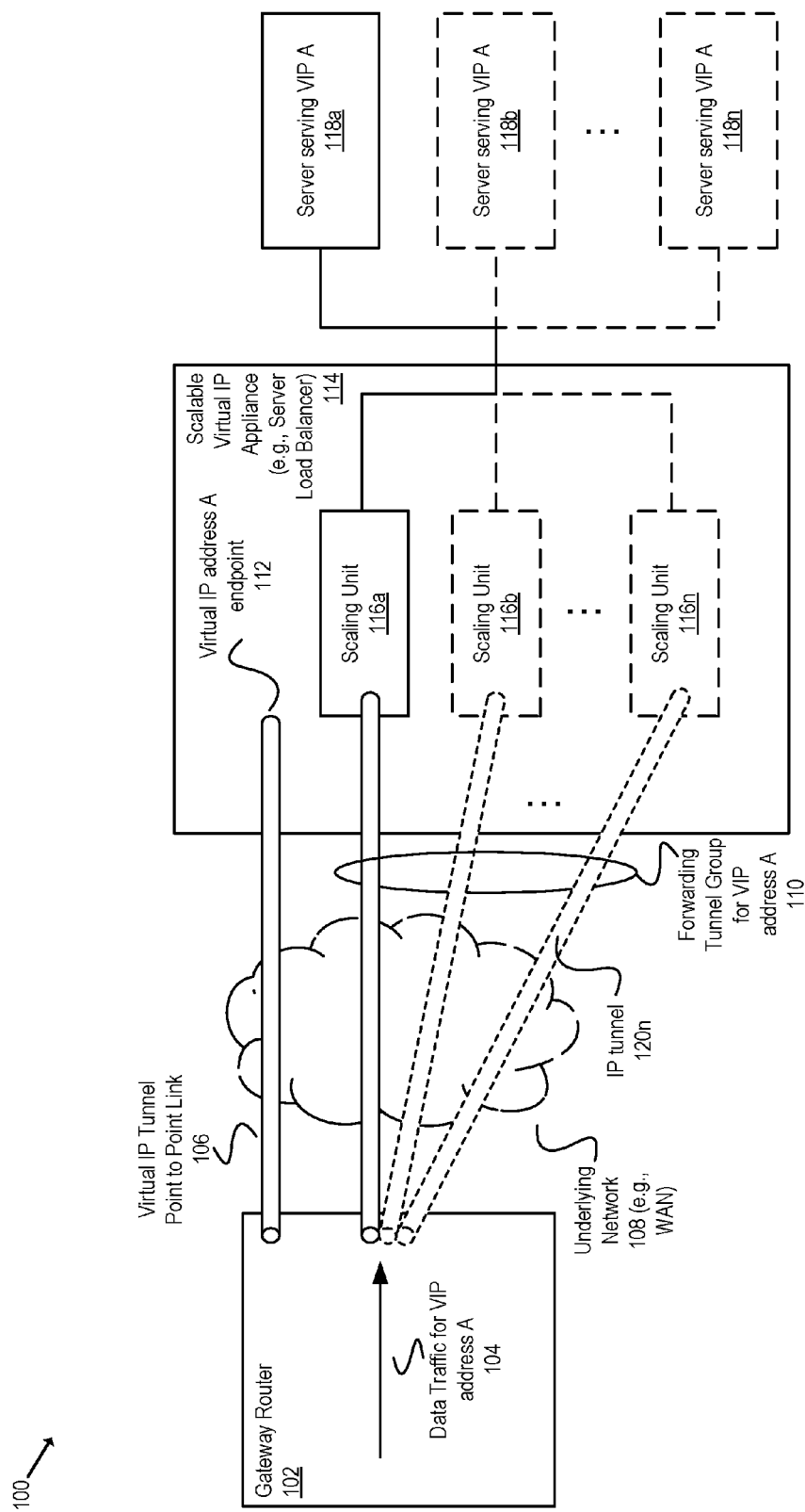
FIG. 1 illustrates a block diagram of a system 100 for a method and apparatus for connecting a gateway router to a set of scalable virtual IP network appliances in overlay networks according to an embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A network device may include network interfaces.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

A data store includes a non-transitory computer readable storage medium that stores data. The data store may include some or all of a non-transitory computer readable storage medium within an electronic device. In such a case, the data store may receive requests to read and write data to the non-transitory computer readable storage medium of the data store from a software process source representing software code currently executing via one or more processors on the electronic device. The data store may also receive requests to read and write data from sources external to the electronic device. Alternatively, the data store may be a standalone physical device that includes the non-transitory computer readable storage medium and basic hardware for performing read and write operations against the non-transitory computer readable storage medium. In such a case, the data store is coupled to external electronic device sources and receives requests from these external electronic device sources to read data from or write data to the non-transitory computer readable storage medium of the data store. The data on the data store may be organized in a variety of data structures (e.g., a relational database, a directed graph structure, an association list) depending upon the requirements of the source that makes the read and write requests.

FIG. 1 illustrates a block diagram of a system 100 for a method and apparatus for connecting a gateway router to a set of scalable virtual IP network appliances in overlay networks according to an embodiment of the invention.

System 100 includes a gateway router 102 and a scalable virtual internet protocol (VIP) appliance 114. Gateway routers, such as gateway router 102, may be network devices that connect to VIP appliances (e.g., VIP appliance 114) in order to serve VIP traffic for telco clusters, datacenters, server farms, etc. These VIP appliances may be, for example, Server Load Balancers (SLB) or Firewalls (FW). These appliances may be implemented in hardware as a physical box or may be software only products that may be deployed in a virtualized processing environment, for example a so called Virtualized Network Function (VNF) in a cloud computing datacenter. As the number of allocated servers grow due to an increased demand of service the traffic load to be processed by VIP Appliances increases and thereby the need for scaling the capacity of the VIP Appliances arises as a consequence.

In system 100, external data 104 (e.g., from a virtual private network (VPN)) bound for VIP address A is received by gateway router 102. Gateway router 102 has previously configured a virtual IP tunnel 106 that includes a point to point link (i.e., a point to point VIP tunnel), with the tunnel originating from the gateway router 102 and having an endpoint at the scalable VIP appliance 114, where the endpoint has the VIP address A. This VIP address A is then advertised to the external networks from which the external data 104 arrives from. Note that the VIP address is represented by the letter "A" for ease of understanding and the address may be a standard IP version 4 (IPv4), IP version 6 (IPv6) address, or any other network address. For example, the VIP address "A" can be an IPv4 address with the underlying network being an IPv6 network.

By creating the point to point VIP tunnel, a particular external network (e.g., a VPN) at the gateway router 102 and a corresponding scalable VIP Appliance (e.g., VIP appliance 114) are logically "joined" at the routing control plane level. In some embodiments, the point to point link connecting the gateway router and the VIP appliance is configured as a non-broadcast network.

In some embodiments, gateway router 102 is connected to more than one scalable VIP appliance 114 through more than one point to point VIP tunnel. For external traffic received by the gateway router 102, the gateway router 102 selects the point to point VIP tunnel that has as its endpoint the VIP address corresponding to the destination address of the external traffic. For external traffic 104 with destination address VIP address A, gateway router 102 selects point to point VIP tunnel 106, which has the VIP address A endpoint 112 at scalable VIP appliance 114.

In some embodiments, the received traffic 104 is then forwarded through one or more IP tunnels 120 that are part of a forwarding tunnel group (FTG) 110 for VIP address A. Each of IP tunnels 120 is a tunnel that encapsulates one or more packets from external traffic 104 and has an endpoint at the scalable VIP appliance 114. The FTG 110 is established by the gateway router 102 between the gateway router 102 and the scalable VIP appliance 114 to forward the external traffic 104 for VIP address A. In some embodiments, the FTG 110 is established using the point to point VIP tunnel 106. Each of IP tunnels 120 within FTG 110 may forward portions of external traffic 104 based on certain characteristics of the traffic.

In some embodiments, gateway router 102 separates the one or more packets within the received traffic 104, and classifies each packet based on indicators within each packet (e.g., packet header fields). The packets are forwarded by the gateway router 102 through a specific IP tunnel 120 in FTG 110 based on the classification given to each packet.

In some embodiments, each of IP tunnels 120 in FTG 110 is communicatively coupled to (i.e., has an endpoint at) one of scaling units 116 of the scalable VIP appliance 114. These scaling units 116 are then communicatively coupled to the servers 118 that are responsive to the VIP address associated with scalable VIP appliance 114 (which is in this case VIP address A). The scaling units 116 may perform various functions, including, but not limited to, server load balancing, firewall, and security monitoring. As the traffic 104 to VIP address A increases, the number of servers 118 may be increased and the load placed on the scalable VIP appliance 114 may also increase. As this load increases, more scaling units 116 may be configured at scalable VIP appliance 114 to process the increased amount of traffic. Each of scaling units 116 can be implemented in software, firmware, hardware, or any combination thereof. In some embodiments, each scaling unit 116 is a software module of the scalable VIP appliance 114. In such an embodiment, the addition of a scaling unit 116 to the scalable VIP appliance 114 may be accompanied by the addition of additional hardware processing power (e.g., adding a processor and/or memory) to the underlying hardware executing the scaling units 116 in the scalable VIP appliance 114. In other embodiments, each scaling unit is a hardware module, and additional hardware scaling unit modules may be added to the scalable VIP appliance to increase its processing power.

As the communication between gateway router 102 and scalable VIP appliance 114 is through the overlay VIP tunnel 106 and the IP tunnels 120 of FTG 110, this communication may cross over any type of underlying network 108 (e.g., a wide area network (WAN)). This underlying network 108 may comprise multiple network protocols over multiple network boundaries. As the VIP address for the scalable VIP appliance 114 is tunneled in a point to point link, the gateway router 102 and the scalable VIP appliance 114 do not need to route the VIP address packets through the underlying network 108. The VIP address is also location-wise independent of a specific physical network interface for the gateway router 102 and the scalable VIP appliance 114.

In some embodiments, the scalable VIP appliance 114 is communicatively coupled to servers 118 through one or more IP tunnels, and the underlying network(s) for the one or more IP tunnels may comprise a variety of network protocols. In some embodiments, the scalable VIP application is unaware of any configuration changes made at the gateway router.

The scalable VIP appliance 114 can be physically located at a different location from the gateway router 102. If the gateway router 102 is communicatively coupled to multiple scalable VIP appliances, the overlay VIP tunnels allow each scalable VIP appliance to be isolated from each other, and allows for the address space for each scalable VIP appliance to overlap if necessary. This allows the system to be highly scalable to multiple scalable VIP appliances and multiple scaling units for each appliance.

Such a gateway router that can scale to support multiple VIP tunnels connected to multiple scalable VIP appliances provides the advantage of allowing the system to easily grow. For example, as traffic volume to a VIP Appliance (e.g. an SLB) continues to increase the need to scale the VIP Appliance (e.g., by adding more processor blades on the scalable VIP Appliance) will occur. Additionally, as the number of customers served through the gateway router continues to increase the need to add VIP Appliances occurs.

This scalable system provides a number of advantages over traditional systems, including, but not limited to the advantages of: 1) scaling the capacity of the appliance by partitioning the traffic to be processed over a set of scaling units (SUs) does not limit network interoperability or introduce undesirable side effects with respect to usual networking protocols or introduce non-proportional configuration complexity; 2) where the connections between the gateway router and the VIP appliance are carried across a shared internal network realm (e.g., a LAN) in a datacenter, the system allows scaling to a large number of external connections (e.g., VPNs) connected to a large number of scalable VIP appliances; 3) the interconnection method between the gateway router and a scalable VIP appliance does not impose limitations on routing protocols used for the tunnels; 4) receiving packet traffic with IP destination addresses corresponding to VIP addresses at the Gateway Router is possible without introducing undue limitations to commonly deployed inter-network configurations, such as OSPF (Open Shortest Path First), IS-IS (Intermediate System to Intermediate System), or BGP (Border Gateway Protocol); and 5) using this system, the scalable VIP appliances (e.g., an IP server load balancers or firewall) are intermediary appliances that in the end to end packet handling appear to transparently convey the network traffic in a seamless manner, including network situations such as ICMP (Internet Control Message Protocol) packets.

In contrast, traditional systems for server load balancing, firewall, or other intermediary appliance between a gateway router and the servers that are responsive to a destination address have certain disadvantages. For example, some configurations have a server load balancer on a VLAN with one or more servers and the gateway router. Such a server load balancer is not configured to be scalable. Another traditional approach uses Ethernet link aggregation between servers on a VLAN connected to a router. However, such an approach is confined to a single broadcast domain. This technique tends to become impractical in datacenters with a tiered hierarchy of switches (e.g., those with loop avoidance, link supervision failover schemes and large broadcast domains). Furthermore, this type of technique uses internal protocol support that would need to be supported at both the router side and the appliance side and would in addition require the use of non-standard Ethernet techniques (e.g., proprietary arrangements beyond the IEEE 802.1AX standard).

Yet another traditional approach is to use ECMP (equal cost multi path) to distribute packets among multiple blades, which comprise the intermediary appliance. However, such an approach is also disadvantageous because in case no routing protocol (e.g., OSPF) is used between the appliance and the router static routes would need to be configured for each next-hop address. Furthermore, when dynamic routing is used between router and external networks (e.g., a network using VPNs), the static routes would need to be redistributed in the dynamic routing protocol domain (i.e., the external domain). However, redistribution of static routes is not always permitted either because the risks of side effects (e.g., black holing and loops) or is hindered at the protocol level, for example, if an OSPF stub area is used in the external network. Additionally, when using an ECMP approach, VIP addresses need to be configured on the servers as well as the blades. Therefore, configuring VIP addresses to stub networks or loop-back interfaces on a VIP appliance IP stack(s) interfaces comes with the disadvantage that the end to end protocol handling transparency, for example, respect to ICMP, is not always consistent (as the same VIP address is configured on both the servers and the VIP appliances) which may require nonstandard and costly workaround implementations.

Another disadvantage with traditional systems is the lack of scalability. For example, for the purpose of connecting a gateway router to a set of scalable virtual IP network appliances, Virtual Extensible LAN (VXLAN) (RFC 7348), which uses IP tunneling to tunnel layer 2 Ethernet frames in user datagram protocol (UDP)/IP packets, is much less effective than the method proposed by the invention as VXLAN introduces several additional encapsulation layers and additional complexity. With the introduction of a large number of tenants and VPNs, such as in scalable cloud computing scenarios, traditional solutions fall short due to practical configuration problems resulting from the necessity of configuring a large volume of low level abstraction commands and technology limits.

Thus, referring again to FIG. 1, the system 100 is a desirable and advantageous improvement. Further details regarding embodiments of the invention will be described below with reference to FIGS. 2-9.

Figure 2:
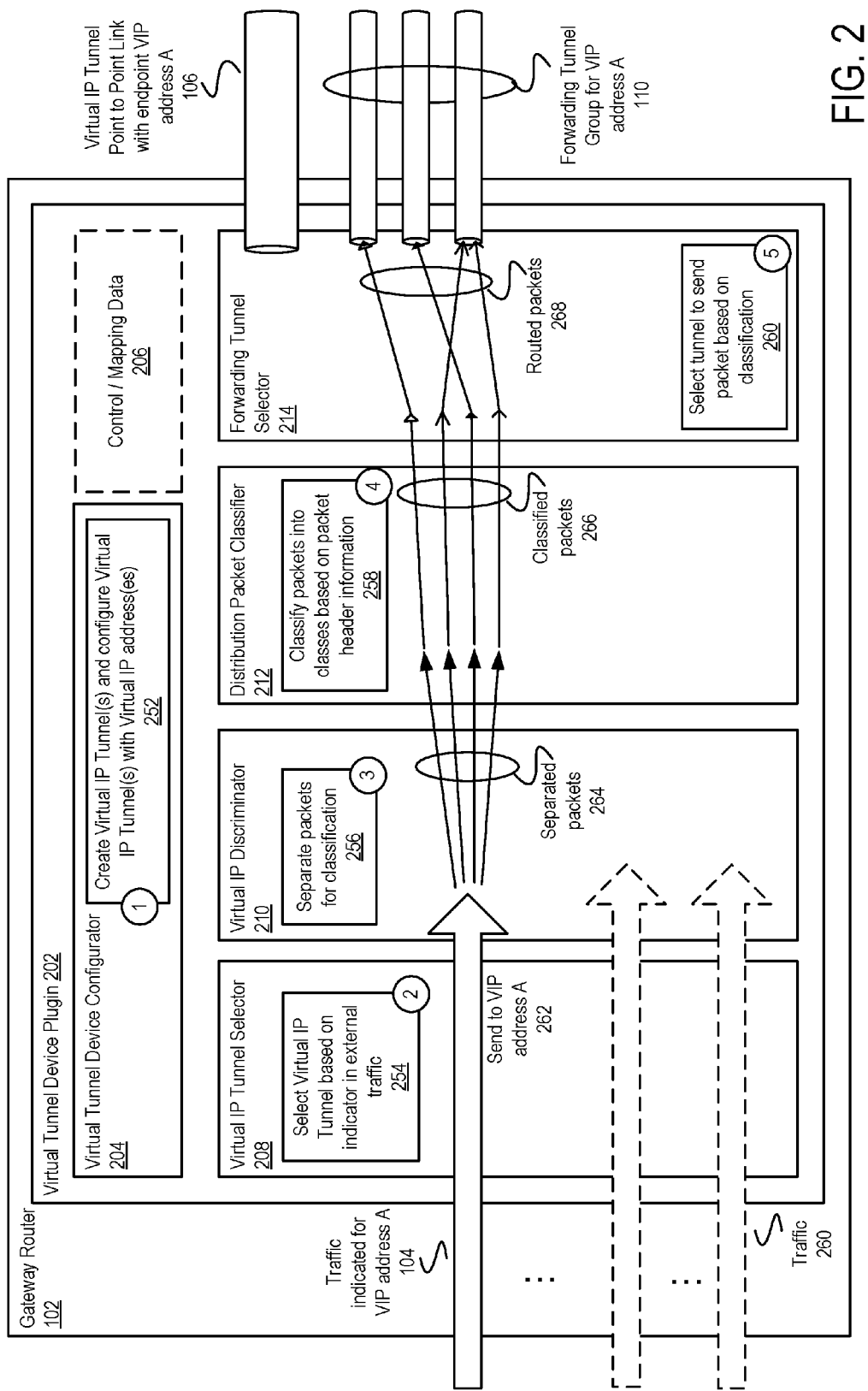
FIG. 2 is a block diagram illustrating a virtual tunnel device plugin 202 in a gateway router 102 for a method and apparatus for connecting a gateway router to a set of scalable virtual IP network appliances in overlay networks according to an embodiment of the invention.

FIG. 2 is a block diagram illustrating a virtual tunnel device plugin 202 in a gateway router 102 for a method and apparatus for communicatively coupling a gateway router to a set of scalable virtual IP network appliances in overlay networks according to an embodiment of the invention.

Virtual tunnel device (VTD) plugin 202 may be implemented in hardware and/or software on gateway router 102. VTD plugin 202 may include the functionality needed to communicatively couple the gateway router to one or more scalable VIP appliances.

VTD plugin 202 includes a virtual tunnel device configurator 204. At block 252, VTD configurator 204 creates the point to point VIP tunnels between the gateway router 102 and one or more scalable VIP appliances, and configures the point to point VIP tunnels, such as point to point VIP tunnel 106, with VIP addresses. This establishes a point to point link between the gateway router and the associated scalable VIP appliance.

The VIP address in the gateway router 102 is implemented as an IP address configured to the remote end of a point to point link. In some embodiments, the VIP address is one of several remote IP addresses of a point to multipoint network encapsulated in the point to point VIP Tunnel. The VTD configurator 204 also creates the forwarding tunnel group (FTG), such as FTG 110, that is associated with the point to point VIP Tunnel and configures the individual IP tunnel(s) of the FTG, which are terminated at the scaling units (e.g., scaling units 116) of the scalable VIP appliance that has the point to point VIP tunnel as its endpoint.

For example, the VTD configurator 204 may configure a point to point VIP tunnel 106 to a scalable VIP appliance with the endpoint VIP address A. This establishes the point to point link between the gateway router 102 and the scalable VIP appliance associated with VIP address A (e.g., scalable VIP appliance 114). The VTD configuration may also configure a FTG 110 for the same VIP address A associated with the point to point VIP tunnel 106.

In some embodiments, the IP tunnels, whether they are used to encapsulate the point to point link or used for the FTG, use encapsulation technologies such as Generic Routing Encapsulation (GRE) (RFC 2784), Realm Specific IP (RSIP) (RFC 3103), Generic Packet Tunneling in IPv6 (RFC 2473), and/or Virtual eXtensible Local Area Network (VXLAN) (RFC 7348).

In some embodiments, in order to create the point to point VIP tunnel connecting to the scalable VIP appliance, the gateway router 102 utilizes the routing information of the underlying network (e.g., underlying network 108) such that the gateway router 102 may establish a route to the scalable VIP appliance via the underlying network. The gateway router may know the static route to the scalable VIP appliance, or the gateway router may use a dynamic routing protocol to determine a route to the scalable VIP appliance.

In some embodiments, using this routing information, the gateway router 102 creates an IP tunnel to the scalable VIP appliance, such as scalable VIP appliance 114. In some embodiments, the tunnel is created by the VTD configurator 204 and is connected to an interworking controller (IW controller) of the scalable VIP appliance 114. The gateway router and the IW controller may use the Interface to Routing Systems (I2RS) suite of protocols (IETF) to communicate with each other. Once the tunnel is established, the gateway router 102 may transmit and receive one or more packets of a supervision, configuration, and control protocol (SCCP) with the scalable VIP appliance 114 through the IP tunnel to establish an SCCP session.

In some embodiments, once the SCCP session is established, the scalable VIP appliance 114 (possibly through the IW controller) transmits a message that is received by the gateway router 102 to indicate which VIP address(es) should be used for VIP traffic to the scalable VIP appliance 114. These VIP address(es) are stored in one or more storage devices accessible by the gateway router 102.

In some embodiments, the VIP address(es), along with any configuration information for the scalable VIP appliance 114 associated with the VIP address(es), are stored in a control/mapping data store 206. For example, the control/mapping data store 206 can be implemented as data structures stored in one or more storage devices accessible by the gateway router 102. In some embodiments, the gateway router 102 (possibly through the VTD configurator 204), configures a point to point link on the IP tunnel between the gateway router 102 and the scalable VIP appliance 114 where the remote endpoint of the point to point link is the VIP address indicated by the scalable VIP appliance 114. In some embodiments, this point to point link encapsulated by the IP tunnel is point to point VIP tunnel 106.

In some embodiments, the scalable VIP appliance sends a message that is received by the gateway router 102 to request set up of a FTG with the scalable VIP appliance. The FTG includes one or more IP tunnels connected to one or more scaling units of the scalable VIP appliance.

After the point to point VIP tunnel (e.g., tunnel 106) is established, the external networks from which the external traffic (e.g., traffic 104 and 260) is received from do not need to be aware of any information about the underlying network over which the tunnel passes. The gateway router only needs to announce information to the external network indicating that it has a direct point to point link to the endpoint of the VIP address corresponding to the servers or services that a client may wish to access from the external network. This announcement can occur regardless of whether a static or dynamic routing protocol is used in the external network (e.g., OSPF, IS-IS, BGP, etc.). There is no need to support any additional routing protocols or information, such as those protocols in the underlying network of the IP tunnels. Thus, the VIP address is not configured to the local IP stack of the gateway router. In other words, the VIP address does not share the same logical interfaces as any non-virtual IP address which are routed by the gateway router.

VTD plugin 202 also includes a VIP tunnel selector 208. At block 254, for traffic received by the gateway router 102 from external networks, the gateway router 102, using the VIP tunnel selector 208, selects a point to point VIP tunnel (and associated FTG) to direct the traffic towards based on one or more indicators of the incoming external traffic. For example, these indicators may be based upon the destination address of the external traffic, or based on which connection (e.g., which VPN) the ingress traffic belongs to. For example, in FIG. 2, the gateway router 102, using VIP tunnel selector 208, selects the tunnel with VIP address A to send the data from traffic 104 to, as indicated at 262.

In some embodiments, the external network uses a layer 3 VPN based on MPLS/BGP-MP (Multiprotocol Label Switching/Border Gateway Protocol Multiprotocol). In these embodiments, the gateway router 102, using VIP tunnel selector 208, selects a point to point VIP tunnel based on Route Distinguishers (RD) corresponding to the specific VPN (each VPN may have more than one RD).

After a point to point VIP tunnel is selected for certain external traffic, that external traffic may be forwarded over the FTG associated with that point to point VIP tunnel.

In one embodiment, VTD plugin 202 includes a VIP discriminator 210. At block 256, for packets arriving from an external network destined for a specified VIP address, the VIP discriminator separates these packets for classification. For example, the traffic 104 destined for VIP address A is separated into separated packets 264.

In one embodiment, VTD plugin 202 includes a distribution packet classifier 212. At block 258, distribution packet classifier 212 classifies IP packets addressed to one VIP address (e.g., VIP address A) into a set of classes based on indicators in the packet. In some embodiments, these classes are known as Distribution Equivalence Classes (DEC). In some embodiments, these indicators include various packet header information, such as source IP address, source port, protocol, destination port, and tunnel identifier. In some embodiments, the distribution packet classifier 212 classifies packets address to one VIP address by using a hashing function, such that the packets may be evenly distributed into one or more classes.

In some embodiments, the scalable VIP appliance that has the VIP address as its endpoint (e.g., scalable VIP appliance 114), sends to the gateway router 102 one or more messages indicating how to classify the packets destined for that VIP address. In some embodiments, the IW controller sends these messages using an SCCP protocol.

In one embodiment, VTD plugin 202 includes a forwarding tunnel selector 214. At block 260, for each classified packet 266, the forwarding tunnel selector 214 selects a forwarding IP tunnel from the FTG associated with the destination VIP address for each classified packet 266 based on the class of that classified packet 266. The gateway router 102, possibly using the forwarding tunnel selector, then forwards these routed packets 268 to the correct IP tunnels of the associated FTG. For example, packets associated with VIP address A are forwarded along one of the IP tunnels of FTG 110, as FTG 110 is the associated FTG for VIP address A.

In some embodiments, the scalable VIP appliance that has the VIP address of the classified packets 266 as its endpoint sends one or more messages that are received by the gateway router 102 indicating which forwarding IP tunnel in the associated FTG to use for which class of packets. In some embodiments, these messages are sent by an IW controller on the scalable VIP appliance using SCCP.

In some embodiments, the scalable VIP appliances (e.g., VIP appliance 114) can, upon failure of a scaling unit (e.g., scaling unit 116) or a case of maintenance re-configuration, send a message that is received by the gateway router 102 (and the forwarding tunnel selector 214) to instruct the gateway router 102 to forward packets of a particular packet class to another (specified) forwarding IP tunnel of the FTG (e.g., FTG 110) for that scalable VIP appliance. In some embodiments, this message is sent using an IW controller on the scalable VIP appliance using a SCCP protocol.

In some embodiments, the gateway router 102 can send a message to a scalable VIP appliance (e.g., VIP appliance 114) that forwarding over a particular forwarding tunnel is failing (e.g., due to timing out, packet loss), whereupon the scalable VIP appliance may send a message to the gateway router 102 indicating to use a different forwarding IP tunnel.

In some embodiments, the number of forwarding IP tunnels of a FTG are added or removed based on the need of the system and the number of scaling units of the corresponding scalable VIP appliance.

In some embodiments, in the case when the scalable VIP appliance (e.g., VIP appliance 114) needs to influence routing protocol specific parameters dynamically in the gateway router 102 (e.g., using an IW controller in the scalable VIP appliance), the I2RS suite of protocols are used for this purpose and the messages of the I2RS protocols are tunneled in the VIP tunnel that comprises the point to point link between the scalable VIP appliance and the gateway router 102.

As noted above, such a system has many advantages. One potential advantage is that supervision of forwarding IP tunnels scales better. In some embodiments, the SCCP protocol can inform the gateway router 102 in case a scaling unit on the scalable VIP appliance fails. This is advantageous in that the forwarding tunnels in a FTG do not need to be individually supervised with a high frequency heart beat protocol.

Another advantage is that, in some embodiments, when a large number of scalable VIP appliances are used, since each VIP Appliance can store the data required for setting up the FTGs and off-load some of the configuration work, the initial configuration complexity on the gateway router is reduced.

For the external network, such a system is protocol transparent with respect to established routing protocols and with regards to ICMP handling. By creating a point to point link and using IP tunnels, the details of the underlying network, which may include datacenter specifics such as the forwarding arrangement between the gateway router 102 and the scaling units of a VIP appliance (e.g., scaling units 116), can be ignored by the external networks.

Furthermore, using this system, no dynamic routing protocol is required to be implemented for the scalable VIP appliance (i.e., the VIP appliance does not need to transmit dynamic routing information to the external networks). Instead, the implementation can be centralized at the gateway router 102 using a plugin, such as VTD plugin 202.

Additionally, no static routes are configured for VIP address in the gateway router as redistribution of static routes into dynamic protocols comes with known side effects, and sometimes such a redistribution cannot be achieved, such as in the case of an OSPF (Open Shortest Path First) stub area (as an OSPF stub area does not accept external route advertisements).

By removing the details of the underlying network from the connection, such a system may also simplify configuration and troubleshooting for network administrators.

Another advantage is that the VIP addresses are not configured to the interfaces of local IP stack (e.g., loop-back) of the Gateway Router. This decoupling VIP addresses from the local IP stack of the Gateway Router avoids undesirable internetworking side effects. For example, this system avoids the issue where if a VIP address was configured to an interface or loopback of the local stack on a gateway router and an external packet from an external network using an Internet Protocol Security (IPsec) VPN was received that was too large to be further forwarded to the VIP appliance, the gateway router would return a clear-text ICMP message (with a VIP address as source IP address) indicating that the destination (VIP address) is unreachable and that fragmentation is needed. This ICMP response is in fact contradictory as it indicates that the destination is unreachable yet provides a response ICMP message from the same address that is indicated as the unreachable destination. At the IPsec level, such a clear text packet would be dropped at the client side because it is not encrypted as the IPsec policy configured at the client side assumes encryption for packets with a VIP destination address or a VIP source IP address.

Instead, as the point to point VIP tunnel encapsulates a point to point link where the VIP address is at the remote end-point of the point to point link, the VIP address is not configured to an interface or loop-back interface of the local IP stack of the gateway router, therefore when the gateway router receives a packet from the external network and the gateway router is unable to forward this packet to the VIP appliance because the packet is too large, and the source IP address of the "ICMP destination unreachable" response message will be the IP address of the ingress interface (on the external side of the gateway router) on which the packet (that caused the ICMP response) arrived on. The said ingress interface IP address is a different IP address than the VIP address and therefore in this case there is no contradiction with respect to a responding unreachable address, because the response ICMP source IP address is indeed from a reachable address. At the IPsec level, such a clear text packet with an ingress interface address as the source IP address would not be dropped at the client side and this way the client side can in this situation act without error according to the expected protocol behavior when an intermediary router is not able to forward a too large packet.

As noted above, this system is also easily scalable to a large number of VIP appliances. For example, using a layer 3 encapsulation based on MPLS/BGP-MP protocols, the system can easily scale to a very large size without burdening the underlying network significantly.

Figure 3:
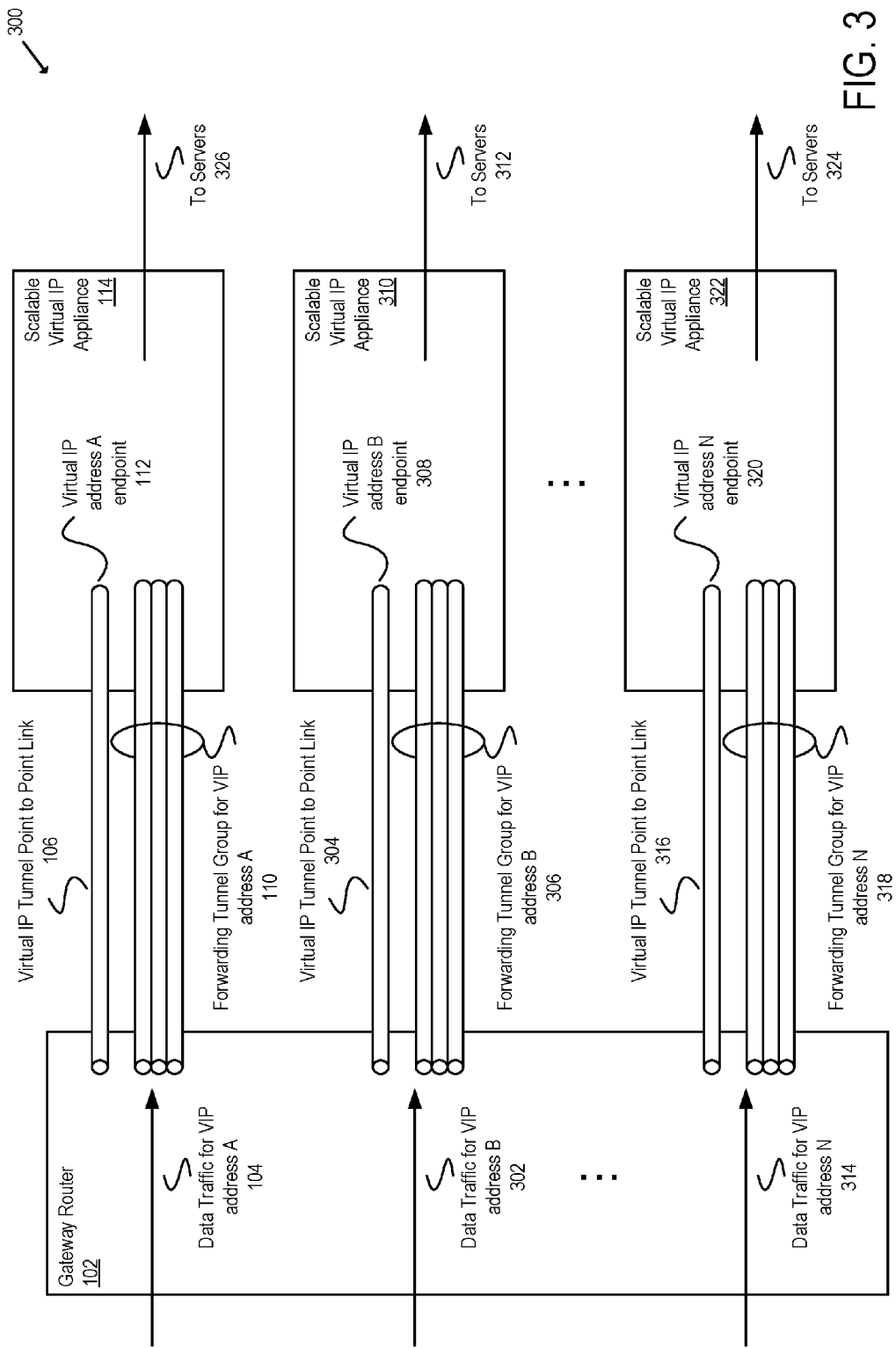
FIG. 3 illustrates a system 300 with multiple scalable VIP appliances for a method and apparatus for connecting a gateway router to a set of scalable virtual IP network appliances in overlay networks according to an embodiment of the invention.

FIG. 3 illustrates a system 300 with multiple scalable VIP appliances for a method and apparatus for connecting a gateway router to a set of scalable virtual IP network appliances in overlay networks according to an embodiment of the invention.

While FIG. 1 was described with reference to a single scalable VIP appliance 114, in other embodiments, gateway router 102 supports more than one scalable VIP appliances, such as scalable VIP appliances 114, 310, 322, and so on.

Each of these scalable VIP appliances 114, 310, and 322 has as a point to point endpoint VIP address A, VIP address B, and VIP address N, respectively (shown as 112, 308, and 320 in FIG. 3).

In some embodiments, a VTD configurator 204 within gateway router 102 creates the point to point VIP tunnels 106, 304, and 316, and the associated IP tunnels in the FTGs (forwarding tunnel group) 110, 306, and 318, according to the embodiments described above with reference to FIG. 2.

When external traffic 104 destined for VIP address A arrives at gateway router 102, gateway router 102 selects the FTG 110 associated with VIP address A to forward the packets that comprise external traffic 104. In some embodiments, this selection is performed by a VIP tunnel selector 206 within the gateway router 102. Likewise, FTG 306 is selected for external traffic 302 and FTG 318 is selected for external traffic 314.

After scalable VIP appliances 114, 310, and 322 process the external data that they receive, the data may be sent to servers 326, 312, and 324, respectively. For example, if the scalable VIP appliances in FIG. 3 were server load balancers, then these scalable VIP appliance server load balancers may select one of its connected servers to respond to a request or transaction of the external traffic in such a way to evenly distribute the load among its connected servers.

Although three scalable VIP appliances are illustrated in system 300, in other embodiments, as noted above, the system can easily scale to many more scalable VIP appliances.

Figure 4:
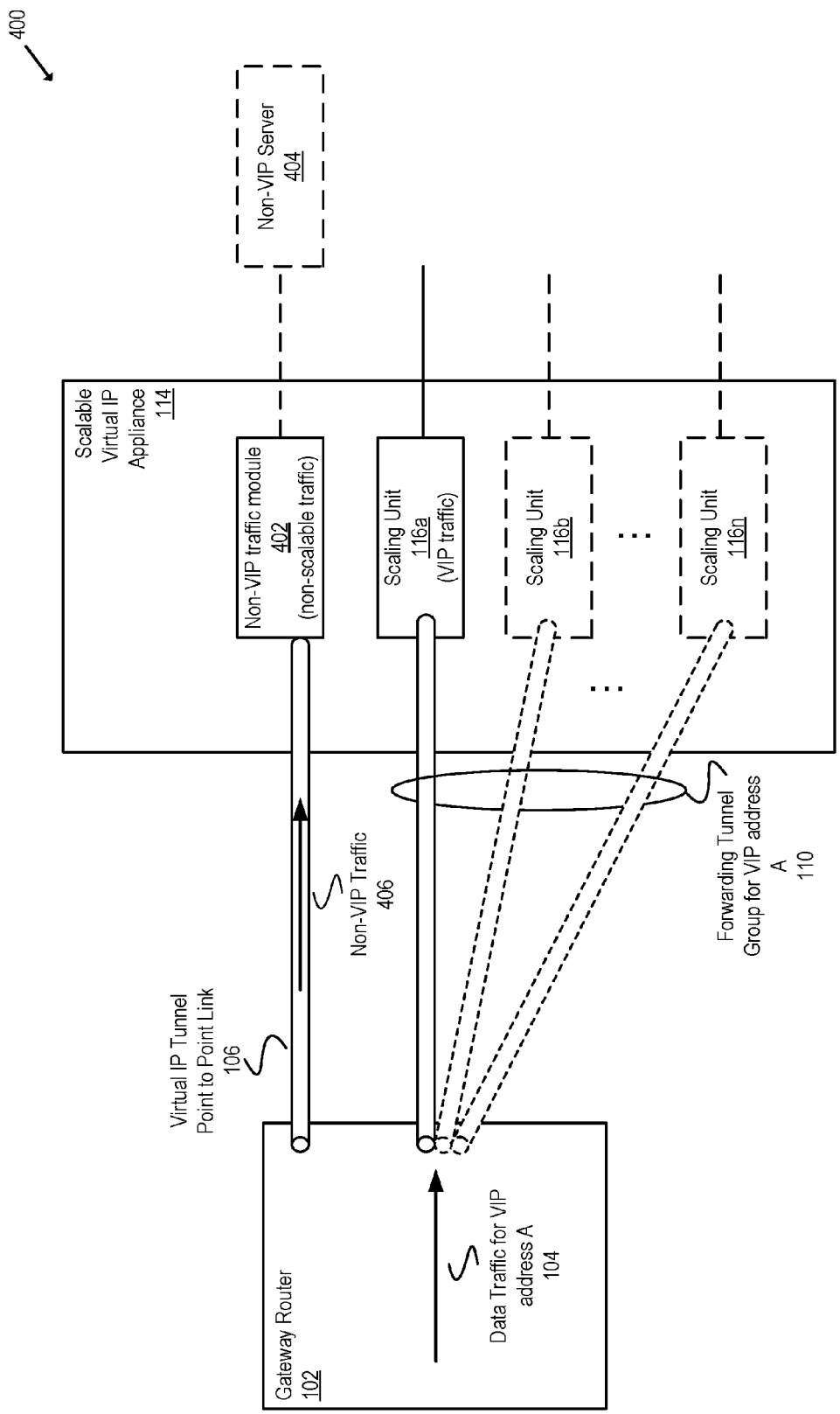
FIG. 4 illustrates a system 400 with a gateway router sending non-VIP traffic to a scalable VIP appliance for a method and apparatus for connecting a gateway router to a set of scalable virtual IP network appliances in overlay networks according to an embodiment of the invention.

FIG. 4 illustrates a system 400 with a gateway router sending non-VIP traffic to a scalable VIP appliance for a method and apparatus for connecting a gateway router to a set of scalable virtual IP network appliances in overlay networks according to an embodiment of the invention.

In some cases, gateway router 102 may send non-VIP traffic 406 to the scalable VIP appliance 114. In other words, this traffic 406 does not have as its destination address the VIP address that is the endpoint of the point to point VIP tunnel 106. Thus, this traffic is not scaled or distributed among the scaling units 116 of the scalable VIP appliance 114. Although this traffic 406 does not have the VIP address as the destination, this traffic may still be forwarded through the point to point VIP tunnel 106. In such a scenario, the point to point VIP tunnel 106 acts as an ordinary tunnel.

For example, referring to FIG. 4, such non-VIP traffic may include I2RS (Interface to Routing Systems) traffic that may be used as a control protocol to configure the FTG 110 associated with the VIP address A for the scalable VIP appliance 114. This non-VIP traffic may be received by a non-VIP traffic module 402. In some embodiments, this non-VIP traffic module 402 is an interworking controller (IW controller) of the scalable VIP appliance 114. The non-VIP traffic module 402 may further be connected to a non-VIP server 404.

Figure 5:
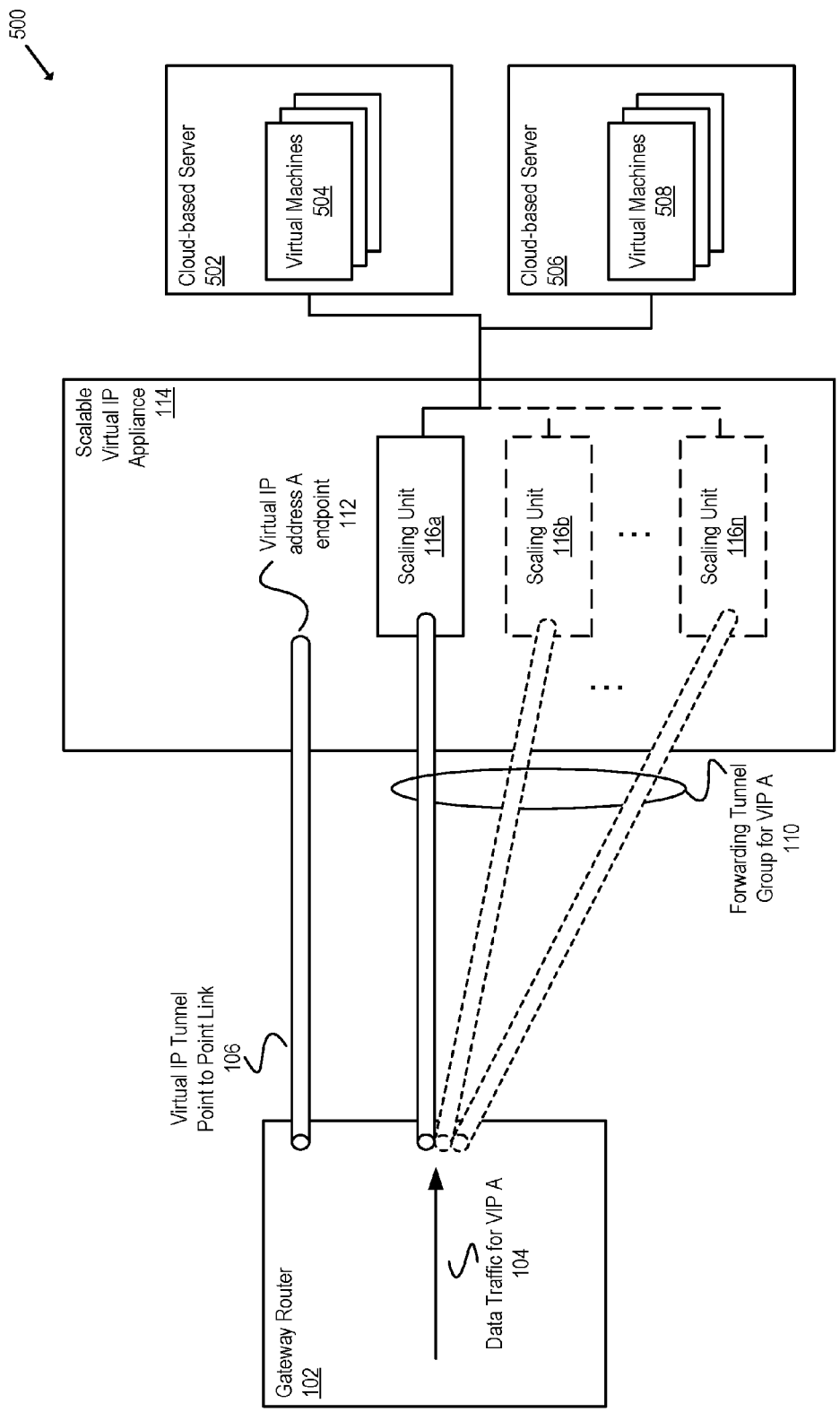
FIG. 5 illustrates a system 500 with a gateway router and a scalable VIP appliance with cloud based servers for a method and apparatus for connecting a gateway router to a set of scalable virtual IP network appliances in overlay networks according to an embodiment of the invention.

FIG. 5 illustrates a system 500 with a gateway router and a scalable VIP appliance with cloud based servers for a method and apparatus for connecting a gateway router to a set of scalable virtual IP network appliances in overlay networks according to an embodiment of the invention.

In some embodiments, the servers connected to a scalable VIP appliance (e.g., VIP appliance 114) are based in the cloud. For example, such cloud based servers (e.g., cloud based servers 502 and 506) may provide a reverse proxy functionality, allowing web applications to offload increased demand for the web application to these cloud based servers. Such a reverse proxy service might need to be able to handle a very large number of requests, and thus might require a scalable load balancing solution such as the one described herein. Each cloud-based server may also run virtual machine software, with each cloud-based server having multiple virtual machines, such as virtual machines 504 and 508. These virtual machines each run an operating system and may each serve a different client or other processes.

In such an embodiment, the scalable VIP appliance 114 in this system 500 may also reside in a cloud environment, and the gateway router 102 may reside in a cloud environment as well. However, the cloud based servers (e.g., cloud based servers 502 and 506), the scalable VIP appliance 114, and the gateway route 102 do not necessarily reside on the same underlying network.

Figure 6:
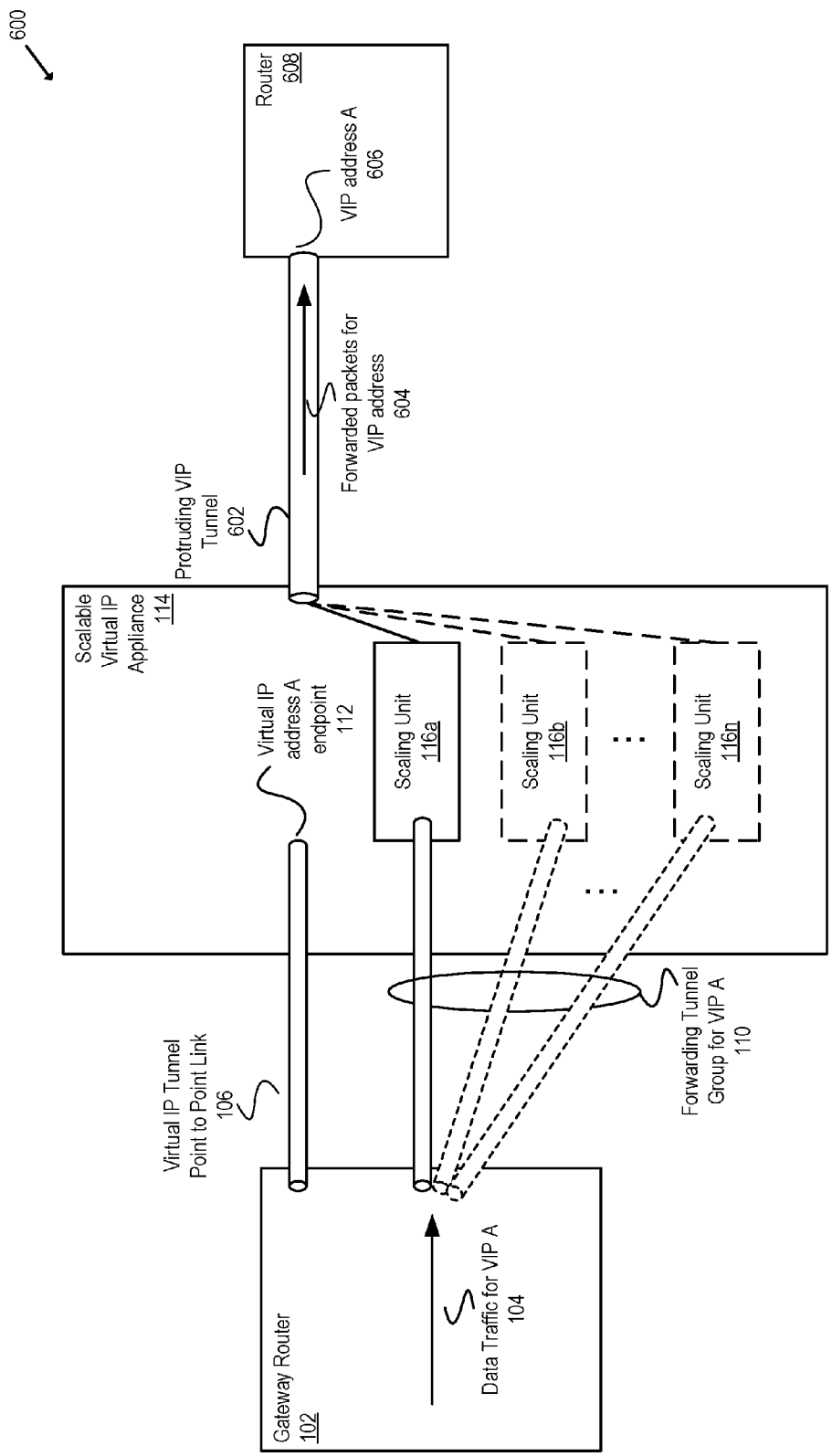
FIG. 6 illustrates a system 600 with a gateway router and a scalable VIP appliance with a protruding VIP tunnel for a method and apparatus for connecting a gateway router to a set of scalable virtual IP network appliances in overlay networks according to an embodiment of the invention.

FIG. 6 illustrates a system 600 with a gateway router and a scalable VIP appliance with a protruding VIP tunnel for a method and apparatus for connecting a gateway router to a set of scalable virtual IP network appliances in overlay networks according to an embodiment of the invention.

In some embodiments, the scalable VIP appliance 114 may further forward traffic bound for a VIP address, such as VIP address A in FIG. 6, to another router, such as router 608. To forward this data, a protruding VIP tunnel 602 is created between the scalable VIP appliance 114 and the new router 608, and packets may be forwarded along this protruding VIP tunnel 602, as indicated at 604. Thus, the point to point VIP tunnel has two segments where for the first segment forwarding is done in forwarding tunnels of a FTG 110 and for the second segment forwarding is done over the protruding VIP tunnel 602. The endpoint of these two sets of tunnels would be at 606. This endpoint 606 is the destination VIP address for the traffic, which in FIG. 6 is VIP address A.

This allows the scalable VIP appliance 114 to be used as an intermediary to intercept traffic that has not yet reached its destination. In this case, the scalable VIP appliance 114 could act as a firewall, or as a security monitoring service, or any other intermediary device that may be placed in line between a source and a destination in a network. Unlike a non-scalable device, scaling units 116 may simply be added to the scalable VIP appliance 114 if traffic increases along the route between the gateway router 102 and the remote router 608.

Figure 7:
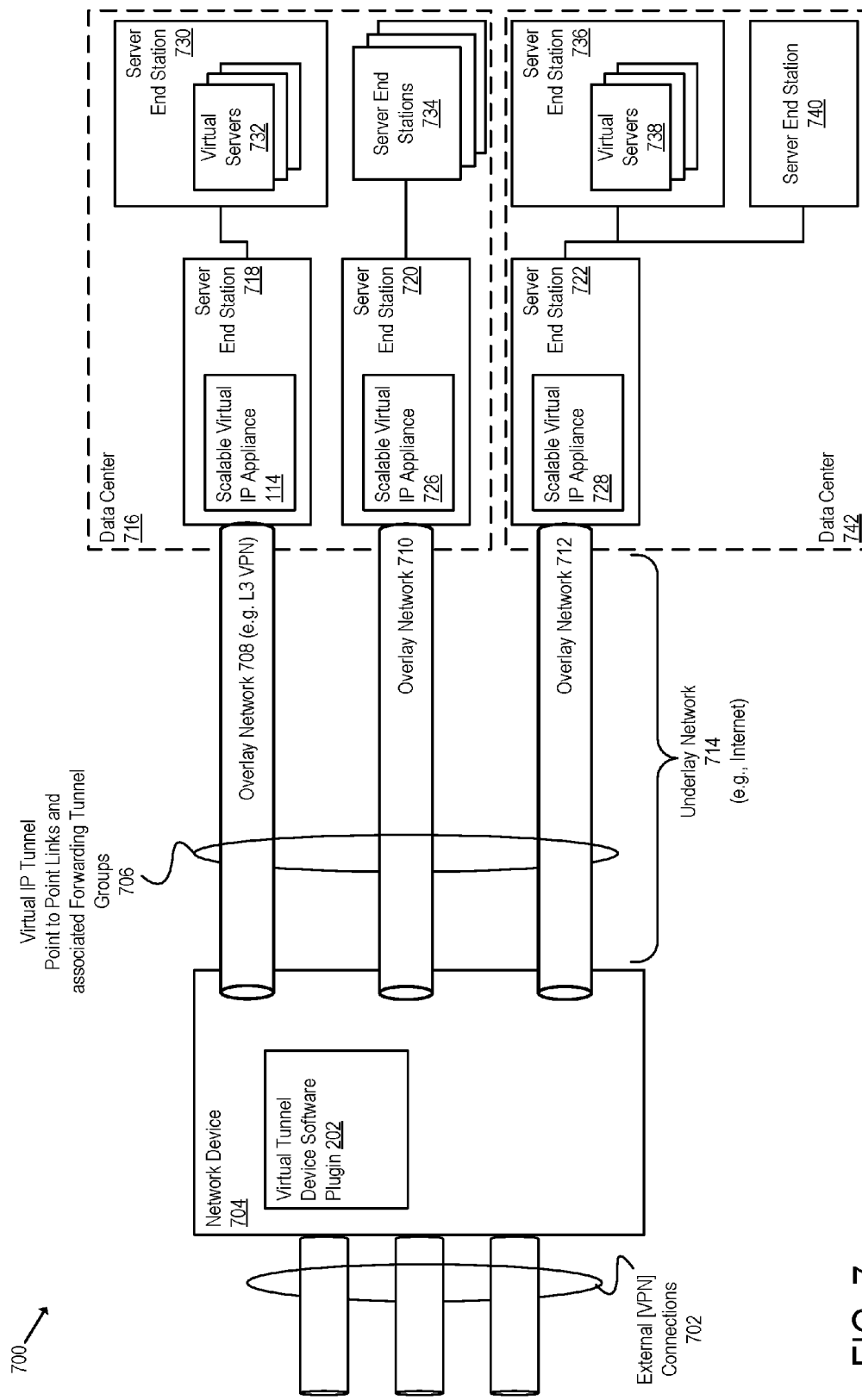
FIG. 7 illustrates a system 700 for an exemplary hardware configuration for a method and apparatus for connecting a gateway router to a set of scalable virtual IP network appliances in overlay networks according to an embodiment of the invention.

FIG. 7 illustrates a system 700 for an exemplary hardware configuration for a method and apparatus for connecting a gateway router to a set of scalable virtual IP network appliances in overlay networks according to an embodiment of the invention.

One or more external connections 702 are received by one or more network interfaces of a network device 704. These external connections 702 may be VPN connections (e.g., IPsec VPN). In some embodiments, network device 704 is gateway router 102. Network device 704 includes a VTD software plugin 202. As described above with reference to FIG. 2, this VTD plugin 202, in some embodiments, forwards the data received from the external connections 702 along one or more VIP tunnels with associated FTGs 706 to one or more scalable VIP appliances 114, 726, and 728. Each VIP tunnel may encapsulate a point to point or point to multipoint link with the respective scalable VIP appliance.

Each of the point to point VIP tunnels and FTGs 706 may use a different overlay network 708, 710, and 712. For example, overlay network 708 may be MPLS/BGP-MP, while overlay network 710 uses VXLAN. These various tunnels 706 all use underlying network 714, which may comprise multiple routing and network protocols such as BGP, IS-IS, OSPF, etc.

Each of the VIP tunnels with their associated FTG is connected to a scalable VIP appliance running on server end stations 718-722. A server end station may be a hardware component with processor and memory storing server software, such as the scalable VIP appliance.

More than one of these server end stations 718-722 may reside in a datacenter. For example, in FIG. 7, server end stations 718 and 720 both reside in data center 715. Although not depicted here, one server end station may have multiple scalable VIP appliances.

The scalable VIP appliances (e.g., VIP appliances 114, 726, and 728) are communicatively coupled to associated server end stations that are responsive to the VIP addresses for which the scalable VIP appliances are an endpoint. Each scalable VIP appliance may be communicatively coupled to a different configuration of server end station. For example, scalable VIP appliance 114 is communicatively coupled to server end station 730 that has virtual servers 732 (i.e., virtual machines with server software), while scalable VIP appliance 726 is not communicatively coupled to any virtual servers, but is communicatively coupled to multiple server end stations. Scalable VIP appliance 726 is connected to both virtual servers (e.g., virtual servers 738) and hardware server end stations (e.g., server end station 740).

While FIG. 7 depicts one hardware configuration for the systems described above, in other embodiments, the systems described above are implemented in other combinations of hardware and software known to the art.

Figure 8:
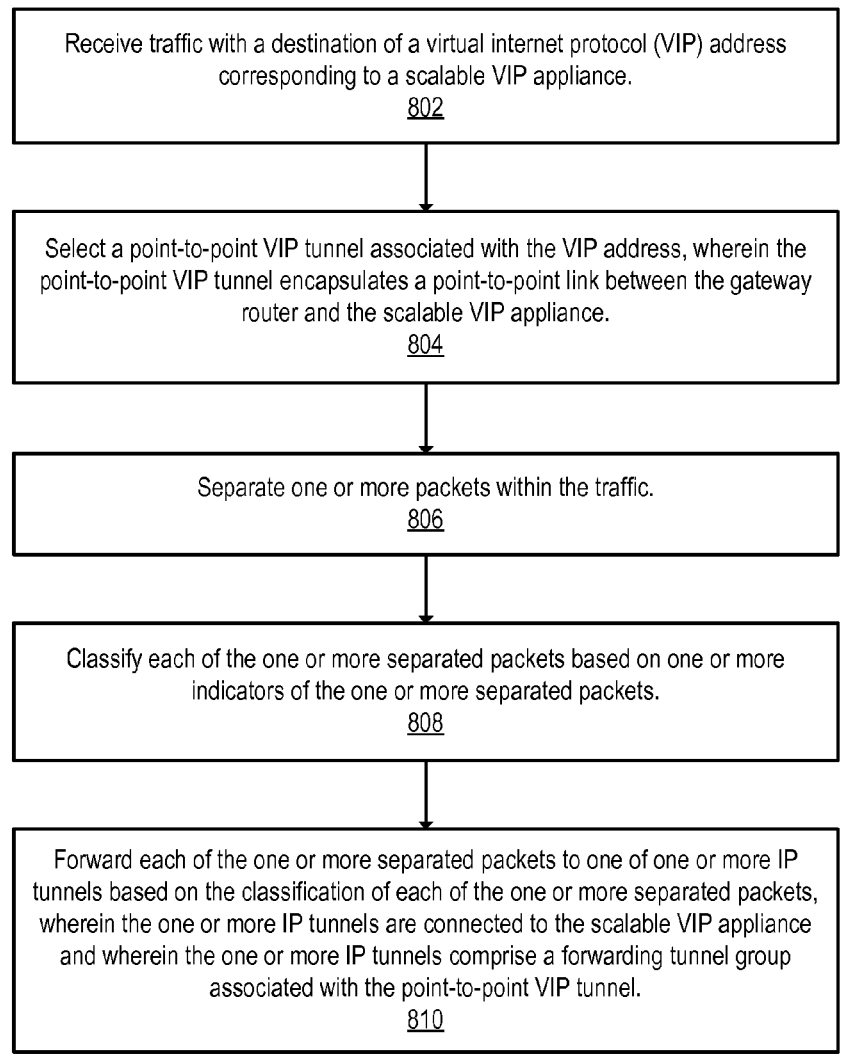
FIG. 8 is a flow diagram illustrating a method 800 for connecting a gateway router to a set of scalable virtual IP network appliances in overlay networks according to an embodiment of the invention.

FIG. 8 is a flow diagram illustrating a method 800 for connecting a gateway router to a set of scalable virtual IP network appliances in overlay networks according to an embodiment of the invention. For example, method 800 can be performed by the gateway router 102. Method 800 may be implemented in software, firmware, hardware, or any combination thereof. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 8, at block 802, a gateway router receives traffic with a destination of a virtual internet protocol (VIP) address corresponding to a scalable VIP appliance. In some embodiments, block 802 is performed by a network interface. At block 804, the gateway router selects a point-to-point VIP tunnel associated with the VIP address, wherein the point-to-point VIP tunnel encapsulates a point-to-point link between the gateway router and the scalable VIP appliance. In some embodiments, block 804 is performed by a VIP tunnel selector. At block 806, the gateway router separates one or more packets within the traffic. In some embodiments, block 806 is performed by a VIP discriminator. At block 808, the gateway router classifies each of the one or more separated packets based on one or more indicators of the one or more separated packets. In some embodiments, block 808 is performed by a distribution packet classifier. At block 810, the gateway router forwards each of the one or more separated packets to one of one or more IP tunnels based on the classification of each of the one or more separated packets, wherein the one or more IP tunnels are connected to the scalable VIP appliance and wherein the one or more IP tunnels comprise a forwarding tunnel group associated with the point-to-point VIP tunnel. In some embodiments, block 804 is performed by a forwarding tunnel selector.

In some embodiments, the gateway router is connected to a plurality of point to point VIP tunnels, with each point to point VIP tunnel corresponding to a scalable VIP appliance.

In some embodiments, each of the one or more IP tunnels in the forwarding tunnel group is connected to a scaling unit of the scalable VIP appliance, wherein each scaling unit processes the packets that arrive at that scaling unit.

In some embodiments, the traffic received by the gateway router is through a VPN connection.

In some embodiments, the scalable VIP appliance is connected to a plurality of servers that are responsive to the VIP address.

In some embodiments, traffic with a destination address that is not the VIP address is forwarded through the point-to-point VIP tunnel to the destination indicated by the destination address.

In some embodiments, the point-to-point VIP tunnel is a layer 3 tunnel.

In some embodiments, the one or more indicators of the one or more separated packets is based on one or more of an IP address, source port, protocol, destination port, and tunnel ID.

In some embodiments, the gateway router further receives a message from the scalable VIP appliance associating each of the one or more IP tunnels with one or more packet classifications.

In some embodiments, the gateway router further receives another message from the scalable VIP appliance indicating that a packet classification should be associated with a different one of the one or more IP tunnels.

In some embodiments, the gateway router further sends a message to the scalable VIP appliance indicating that one of the one or more IP tunnels has failed; and receives another message from the scalable VIP appliance indicating that a packet classification should be associated with a different one of the one or more IP tunnels.

Figure 9:
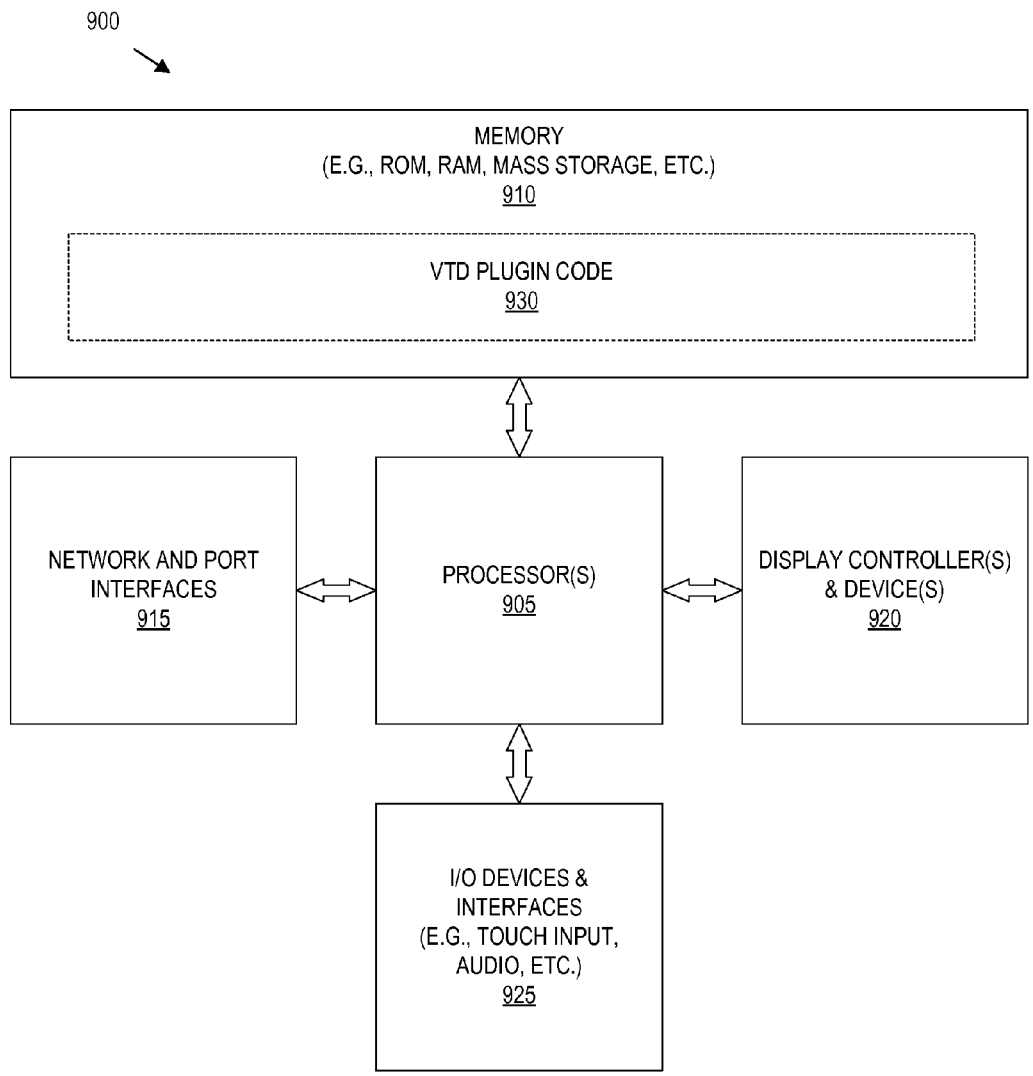
FIG. 9 illustrates a block diagram for an exemplary data processing system 900 that may be used in some embodiments.

FIG. 9 illustrates a block diagram for an exemplary data processing system 900 that may be used in some embodiments. Data processing system 900 includes one or more microprocessors 905 and connected system components (e.g., multiple connected chips). Alternatively, the data processing system 900 is a system on a chip. One or more such data processing systems 900 may be utilized to implement the functionality of the gateway router 102 or the scalable VIP appliance 114, as illustrated in FIGS. 1-8.

The data processing system 900 includes memory 910, which is coupled to the microprocessor(s) 905. The memory 910 may be used for storing data, metadata, and programs for execution by the microprocessor(s) 905. For example, the depicted memory 910 may store VTD plugin code 930 that, when executed by the microprocessor(s) 905, causes the data processing system 900 to perform the operations described herein. The memory 910 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 910 may be internal or distributed memory. In some embodiments, a portion or all of the VTD plugin code 930 is stored on an external cloud device.

The data processing system 900 may also include a display controller and display device 920 that provides a visual user interface for the user, e.g., GUI elements or windows. The display device 920 may also display various media content to the user. The data processing system 900 also includes one or more input or output ("I/O") devices and interfaces 925, which are provided to allow a user to provide input to, receive output from, and otherwise transfer data to and from the system. These I/O devices 925 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 900. The I/O devices and interfaces 925 may also include a connector for a dock or a connector for a USB interface, FireWire, Thunderbolt, Ethernet, etc., to connect the system 900 with another device, external component, or a network. Exemplary I/O devices and interfaces 925 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 900 with another device, external component, or a network and receive stored instructions, data, tokens, etc. In some embodiments, these various components will be provided as a system on a chip (SoC). It will be appreciated that one or more buses may be used to interconnect the various components shown in FIG. 9.

For example, the data processing system 900 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 900 may be a network computer, server, network device, router, or an embedded processing device within another device or consumer electronic product. As used herein, the terms computer, system, device, processing device, and "apparatus comprising a processing device" may be used interchangeably with the term data processing system 900 and include the above-listed exemplary embodiments.

It will be appreciated that additional components, not shown, may also be part of the system 900, and, in certain embodiments, fewer components than that shown in FIG. 9 may also be used in a data processing system 900. For example, in some embodiments where the data processing system 900 is a router, the router may have one or more control cards configure routing in the network and one or more line cards to switch packets in a network based on the routing configuration from the control cards.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 910 or other non-transitory machine-readable storage medium. The software may further be transmitted or received over a network (not shown) via a network and/or port interface 915. In various embodiments, hardwired circuitry may be used in combination with the software instructions to implement the present embodiments. Thus, the techniques are not limited to any specific combination of hardware circuitry and software, or to any particular source for the instructions executed by the data processing system 900.

An electronic device, such as the media devices, portable client devices, server computing devices, and/or content servers described herein, stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a gateway router, comprising:
    receiving traffic with a destination of a virtual Internet protocol (VIP) address corresponding to a scalable VIP appliance;
    selecting a point-to-point VIP tunnel associated with the VIP address, wherein the point-to-point VIP tunnel encapsulates a point-to-point link between the gateway router and the scalable VIP appliance;
    separating one or more packets within the traffic;
    classifying each of the one or more separated packets based on one or more indicators of the one or more separated packets;
    forwarding each of the one or more separated packets to one of one or more Internet Protocol (IP) tunnels based on the classification of each of the one or more separated packets, wherein the one or more IP tunnels are connected to the scalable VIP appliance, and wherein the one or more IP tunnels comprise a forwarding tunnel group associated with the point-to-point VIP tunnel;
    sending a message to the scalable VIP appliance indicating that one of the one or more IP tunnels has failed; and
    receiving another message from the scalable VIP appliance indicating that a packet classification should be associated with a different one of the one or more IP tunnels.

2. The method of claim 1, wherein the gateway router is connected to a plurality of point-to-point VIP tunnels, with each point-to-point VIP tunnel corresponding to a scalable VIP appliance.

3. The method of claim 1, wherein each of the one or more IP tunnels in the forwarding tunnel group is connected to a scaling unit of the scalable VIP appliance, wherein each scaling unit processes the packets that arrive at that scaling unit.

4. The method of claim 1, wherein the traffic received by the gateway router is through a Virtual Private Network (VPN) connection.

5. The method of claim 1, wherein the scalable VIP appliance is connected to a plurality of servers that are responsive to the VIP address.

6. The method of claim 1, wherein traffic with a destination address that is not the VIP address is forwarded through the point-to-point VIP tunnel to the destination indicated by the destination address.

7. The method of claim 1, wherein the point-to-point VIP tunnel is a layer 3 tunnel.

8. The method of claim 1, wherein the one or more indicators of the one or more separated packets is based on one or more of an IP address, source port, protocol, destination port, and tunnel identifier (ID).

9. The method of claim 1, further comprising receiving a message from the scalable VIP appliance associating each of the one or more IP tunnels with one or more packet classifications.

10. The method of claim 9, further comprising receiving another message from the scalable VIP appliance indicating that a packet classification should be associated with a different one of the one or more IP tunnels.

11. A gateway router apparatus, comprising:
    one or more processors; and
    a non-transitory computer-readable medium coupled with the one or more processors and having instructions which, when executed by the one or more processors, cause the gateway router apparatus to:
        receive traffic with a destination of a virtual internet protocol (VIP) address corresponding to a scalable VIP appliance;
        select a point-to-point VIP tunnel associated with the VIP address, wherein the point-to-point VIP tunnel encapsulates a point-to-point link between the gateway router and the scalable VIP appliance;
        separate one or more packets within the traffic;
        classify each of the one or more to be separated packets based on one or more indicators of the one or more to be separated packets;
        forward each of the one or more separated packets to one of one or more Internet Protocol (IP) tunnels based on the classification of each of the one or more separated packets, wherein the one or more IP tunnels are connected to the scalable VIP appliance, and wherein the one or more IP tunnels comprise a forwarding tunnel group associated with the point-to-point VIP tunnel;
        send a message to the scalable VIP appliance indicating that one of the one or more IP tunnels has failed; and
        receive another message from the scalable VIP appliance indicating that a packet classification should be associated with a different one of the one or more IP tunnels.

12. The gateway router apparatus of claim 11, wherein the gateway router apparatus is connected to a plurality of point-to-point VIP tunnels, with each point-to-point VIP tunnel corresponding to a scalable VIP appliance.

13. The gateway router apparatus of claim 11, wherein each of the one or more VIP tunnels in the forwarding tunnel group is connected to a scaling unit of the scalable VIP appliance, wherein each scaling unit processes the packets that arrive at that scaling unit.

14. The gateway router apparatus of claim 11, wherein the traffic received by the gateway router apparatus is through a Virtual Private Network (VPN) connection.

15. The gateway router apparatus of claim 11, wherein the scalable VIP appliance is connected to a plurality of servers that are responsive to the VIP address.

16. The gateway router apparatus of claim 11, wherein the point-to-point VIP tunnel is a layer 3 tunnel.

17. The gateway router apparatus of claim 11, wherein the one or more indicators of the one or more separated packets is based on one or more of an IP address, source port, protocol, destination port, and tunnel identifier (ID).

18. The gateway router apparatus of claim 11, wherein the instructions further cause the gateway router apparatus to:
   create the point-to-point VIP tunnel to the scalable VIP appliance;
   configure the point-to-point VIP tunnel with the VIP address; and
   create the forwarding tunnel group associated with the point-to-point VIP tunnel.

19. A non-transitory computer-readable storage medium having instructions which, when executed by one or more processors of a gateway router, cause the gateway router to perform operations comprising:
   receiving traffic with a destination of a virtual Internet protocol (VIP) address corresponding to a scalable VIP appliance;
   selecting a point-to-point VIP tunnel associated with the VIP address, wherein the point-to-point VIP tunnel encapsulates a point-to-point link between the gateway router and the scalable VIP appliance;
   separating one or more packets within the traffic;
   classifying each of the one or more separated packets based on one or more indicators of the one or more packets;
   forwarding each of the one or more separated packets to one of one or more Internet Protocol (IP) tunnels based on the classification of each of the one or more separated packets, wherein the one or more IP tunnels are connected to the scalable VIP appliance, and wherein the one or more IP tunnels comprise a forwarding tunnel group associated with the point-to-point VIP tunnel;
   sending a message to the scalable VIP appliance indicating that one of the one or more IP tunnels has failed; and
   receiving another message from the scalable VIP appliance indicating that a packet classification should be associated with a different one of the one or more IP tunnels.

20. The non-transitory computer-readable storage medium of claim 19, wherein the gateway router is connected to a plurality of point-to-point VIP tunnels, with each point-to-point VIP tunnel corresponding to a scalable VIP appliance.

21. The non-transitory computer-readable storage medium of claim 19, wherein each of the one or more VIP tunnels in the forwarding tunnel group is connected to a scaling unit of the scalable VIP appliance, wherein each scaling unit processes the packets that arrive at that scaling unit.

22. The non-transitory computer-readable storage medium of claim 19, wherein the traffic received by the gateway router is through a Virtual Private Network (VPN) connection.

23. The non-transitory computer-readable storage medium of claim 19, wherein the scalable VIP appliance is connected to a plurality of servers that are responsive to the VIP address.

24. The non-transitory computer-readable storage medium of claim 19, wherein traffic with a destination address that is not the VIP address is forwarded through the point-to-point VIP tunnel to the destination indicated by the destination address.

25. The non-transitory computer-readable storage medium of claim 19, wherein the point-to-point VIP tunnel is a layer 3 tunnel.

26. The non-transitory computer-readable storage medium of claim 19, wherein the one or more indicators of the one or more separated packets is based on one or more of an IP address, source port, protocol, destination port, and tunnel identifier (ID).

* * * * *